April 18, 1961 W. DEICHMANN 2,980,421
TURNTABLE SPREADING MACHINES
Filed March 20, 1957 6 Sheets-Sheet 1

INVENTOR
WALTER DEICHMANN.
BY Harry L. Burkitt
ATTORNEY

INVENTOR
WALTER DEICHMANN.
BY Henry L. Burkitt
ATTORNEY

April 18, 1961  W. DEICHMANN  2,980,421
TURNTABLE SPREADING MACHINES
Filed March 20, 1957  6 Sheets-Sheet 4

INVENTOR
*WALTER DEICHMANN.*
BY Henry L. Burkitt
ATTORNEY

United States Patent Office 2,980,421
Patented Apr. 18, 1961

2,980,421

TURNTABLE SPREADING MACHINES

Walter Deichmann, Mineola, N.Y., assignor to Cutting Room Appliances Corp., New York, N.Y., a corporation of New York Filed Mar. 20, 1957, Ser. No. 647,407

23 Claims. (Cl. 270—31)

This invention relates to turntable spreading machines.

Certain types of machines are used to spread sheet material under conditions where the material to be spread must be disposed with its nap, or pattern, or other property, in a predetermined relationship which does not permit the sheet material to be spread by a process in which the sheet is folded back and forth in the production of multiple layers. For this purpose, a so-called "turntable" machine is used, in which case it is necessary to cut off each layer when its spreading has been completed, and before commencing the spreading of a new layer. Such cutting may be done by hand, or by automatic machinery. After that layer is cut, it may be necessary to swivel the carrier of the sheet material supply to bring the sheet into the desired relationship with the previously produced layers. This is the purpose of the "turntable." Turntables generally introduce problems, including great weight and awkwardness in the successive operations of producing new layers since the swivelling may introduce inaccuracies of adjustment for the production of such successive layers.

It is an object of the invention to provide a turntable machine wherein the structure is simplified to such extent that it is made very light to facilitate handling, as well as to make its construction simple, and yet that the necessary rigidity and strength are incorporated so that it may absorb the shocks of normal operation.

It is an object of the invention to provide apparatus of the type indicated wherein adjustment of the machine, to accommodate for slight variances at any stage of the operation, may be made with facility and ease, and without placing any burden upon the worker whose duty it is to propel the machine.

Machines of the type indicated generally are propelled by a man pushing the carriage along a table while the sheet material is being spread. The new layer, as it is being laid down upon other superposed layers, must coincide at its edges as closely as possible with the edges of the layers already spread. Ordinarily, the workman must stop the machine to make adjustment manually to obtain this coincidence of the edges.

It is an object of the invention to provide in a machine of the type indicated apparatus to effect the lateral adjustment for conforming the layer being spread positively to layers already laid down which may be made effective by the workman at the same time as he pushes the machine along the table to effect the spreading of the layer.

To load a machine of the type indicated, it generally is necessary to place a roll of the sheet material upon a bar. The bar ends then are supported in suitable bearings provided for that purpose upon a carrier which is supported on the turntable. The carrier normally moves and extends transversely of the table. Difficulties normally are encountered when positioning a roll of material upon such a carrier. It is an object of the invention to provide means by which the carrier may be brought to the side of the table at which the workmen normally stands, and then may be turned to such position that the machine may be loaded with ease, and without any danger from the fact that the carrier is now away from the major center of gravity of the machine.

It is an object of the invention to provide a structure in which, despite lightness in construction, particularly with relation to the weight of the load, the location of the carrier is counterbalanced so that the machine maintains a firm relation to the table at all times, and even during loading operations when the carrier is moved completely to one side of the major center-line and on one side with relation to the major center of gravity.

It is an object of the invention to provide a simple actuating mechanism by which the carrier may, by easy and smooth manipulation by one hand of the workman, be slid easily from side to side of the carriage of the machine as the machine is moved along the table, and even with part of the force for moving the machine along the table being imparted by that same hand.

In machines of the type indicated, it is desirable that spreading of sheet material be done by a device which is as close to the table surface as possible. It is an object of the invention to provide, as a part of a machine of the type indicated, a spreading element which itself is capable of vertical adjustment, to bring parts which guide the sheet material to the table as close to the table as possible, and wherein such parts are adjustable easily to vary that range of action with relation to the surface of the table.

It is an object of the invention to provide a fabric guide for a machine of the type indicated which, during the ordinary operation of the machine, will be effective as a substantially rigid member, but which, on the impact of an accidentally dropped member, such as a roll of goods, will give way to prevent damages to parts of the machine from unnecessary stressing.

Other objects of the invention will be set forth hereinafter, or will be apparent from the description and the drawings, in which embodiments are illustrated to exemplify the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of operative embodiments, but not to show all the various forms and modifications in which the invention might be embodied.

On the drawings, in which the same reference characters refer to the same parts throughout, and in which are disclosed such practical constructions:

Fig. 4 is a plan view of the machine shown in Fig.

3, the machine being broken away in part to foreshorten its length;

Fig. 4a is a detail cross-sectional view, substantially on the line 4a—4a of Fig. 4, to illustrate a part of the latching mechanism;

On the drawings, a machine 10 is shown mounted to move along a table 12 to spread layers of sheet material 13, such as fabric, from a roll 14 of such material. The machine may comprise a pair of end frames 16 and 18, held spaced apart by a pair of tubes 20 and 22. Riding on the tubes is a carrier 24 upon which is pivoted a spider 26. Mounted upon the spider is cloth-carrying means 28 for supporting roll 14.

Figure 9:
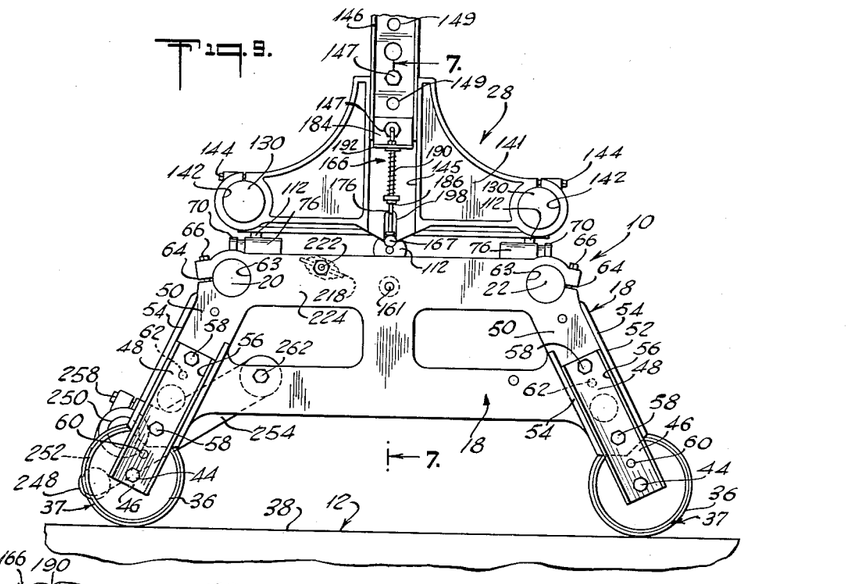
Fig. 9 is an elevational view of the machine as seen from the side opposite that shown in Fig. 3, a portion of the top of the machine being broken away, and illustrating, among other things, parts for adjusting the height of the machine.

In order properly to guide machine 10 for movement lengthwise of the table, a track 30 may be secured to the table at an edge 31. Upon this track roll wheels 32 which may be mounted on stub axles 34 fixed in frame 16. Each wheel 32 may be provided with a groove 35 which fits over track 30, and thus guides the machine in its movement over the table. With the other frame 18 may be associated wheels. 36 (Fig. 9) which may be provided with a tread 37 of material such as rubber which will not mark the table surface as such wheels are intended to roll directly upon top face 38 of the table.

In order to vary the height of the machine so as to determine the top level to which fabric may be piled by the machine, the heights at which wheels 32 and 36 engage their respective frames may be made adjustable. For this purpose, variation may be effected in the lengths of the arms on which wheels 32 and 36 are supported.

Figure 1:
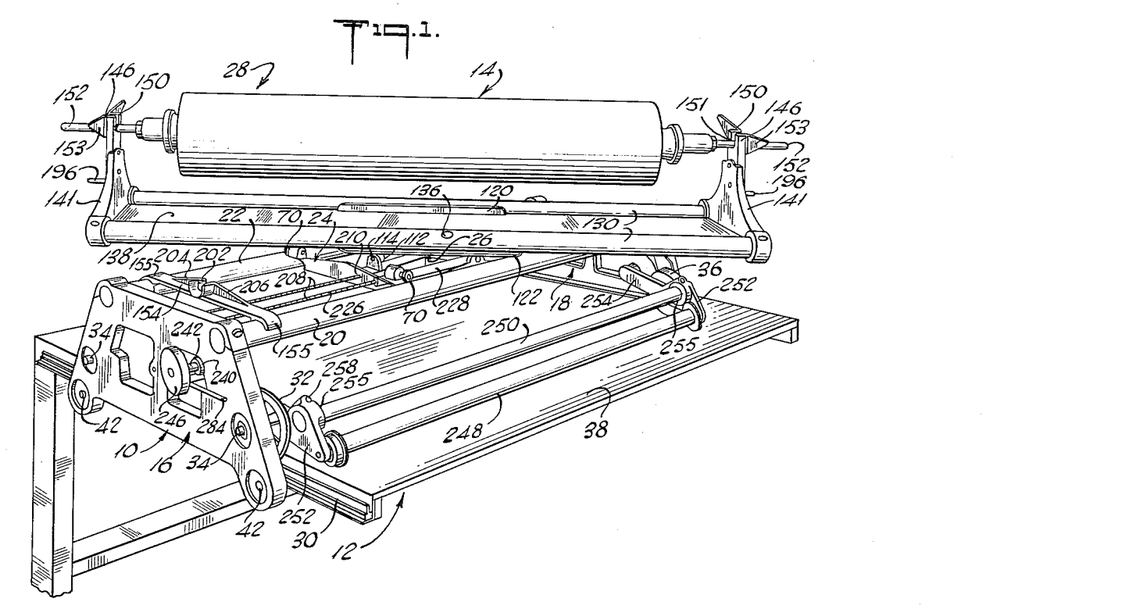
Fig. 1 is an elevational perspective view, showing a machine embodying details of the invention and mounted upon a table, the turntable being adjusted so that the fabric supply has been turned partially from the normal spreading position.

In Fig. 1, a plurality of openings 40 and 42 are shown provided in frame 16. In each pair of openings, opening 40 is spaced an equal distance above its associated opening 42. In Fig. 1, wheels 32 are shown associated with openings 40. Each wheel may be provided support upon stub axle 34 which may be locked in place in opening 40 or 42, as the case may be, by suitable securing means. A bearing, such as a ball or roller bearing, may be mounted between the wheel and the axle. In this association, the machine may pile fabric up to the minimum height. The wheels and their axles may be separated from openings 40, and then be assembled at openings 42. Wheels 36 may then likewise be adjusted. Then fabric may be piled up to the maximum level attainable.

Wheels 36 (Fig. 9) are carried upon spindles passed through openings 44 in the bottoms 46 of channels 48 which may be of U-shaped cross-section. Bottoms 46 are fitted flat against faces 50 of arms 52 which may be integral parts of frame 18. Ribs 54 extend outwardly from faces 50. Between ribs 54, channels 48 are received tightly, the ribs engaging against walls 56. The ribs positively guide the channels and retain them in position. Suitable retainers, such as bolts 58, may be used to secure the channels to frame 18 in a selected adjusted position by engaging through openings 60 in the channels and openings 62 in arms 52. When the height of the machine is to be changed, bolts 58 are loosened, the channels are moved, and bolts 58 are engaged in other openings 60 and 62, to secure frame 18 in the new position to which it has been adjusted.

Each of frames 16 and 18 may have openings 63 formed with a slot 64 to provide jaws of a clamp structure to receive and retain tubes 20 and 22. Suitable securing devices, such as cap screws 66, may be used to draw the jaws together for clamping tubes 20 and 22 in place, to produce a rigid structure.

Tubes 20 and 22 provide tracks (Figs. 1 and 4) upon which ride rollers 70 assembled with carrier 24. Carrier 24 may be made as a casting of light metal such as aluminum, preferably with sufficient metal relieved to increase its lightness, but with longitudinal ribs 72 as well as transverse ribs 74 to increase its strength. A plurality of lugs 76 may be provided to receive stub spindles 78 at which rollers 70 are provided bearings in any suitable manner. Rollers 70 (Figs. 1, 4 and 5) ride upon tubes 20 and 22 substantially at the highest point of the arc provided by the rounded surfaces of the tubes. Frictional contact is thus reduced without affecting the load-carrying capacity of the structure.

Figures 5, 6:
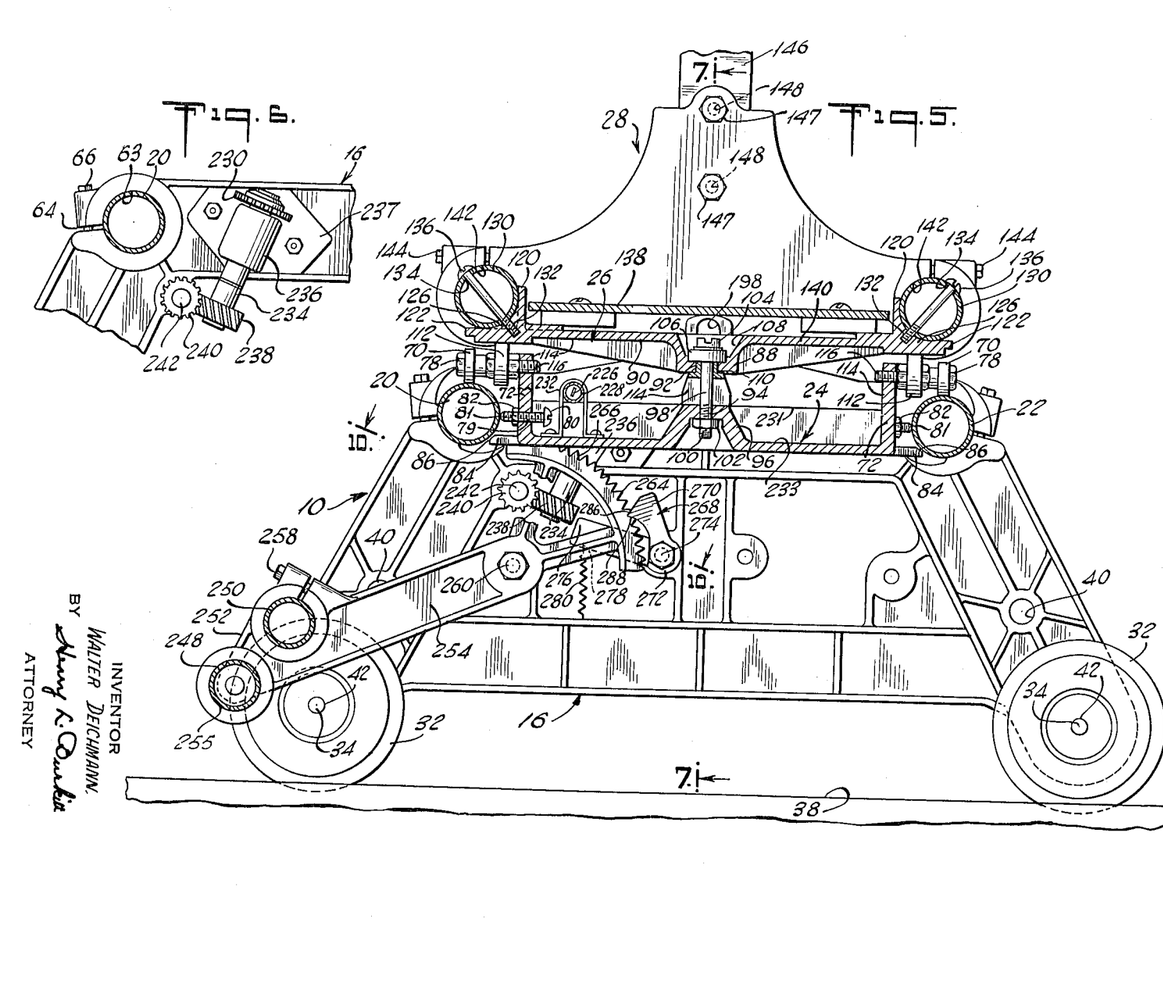
Fig. 5 is a vertical cross-sectional view, to somewhat enlarged scale, substantially on the line 5—5 of Fig. 4, the top of the machine being broken away.
Fig. 6 is a detail cross-sectional view to illustrate the operating parts of a device which facilitates lateral adjustment of the carrier laterally along the guides to adjust the layer being spread as the machine moves along the table to conform to the layers already spread.

In order to impart positive guiding and stability to the structure, even though the rollers are carried substantially tangent to the tubes at their peak, each longitudinal rib 76 may be provided with threaded openings 79 through which are extended limit members in the form of screws 80. These members may be adjusted so that their ends 81 may be brought to within a very small distance from the respective tube 20 or 22 (Fig. 5). Locknuts 82 may be provided to fix the position of ends 81 with relation to the tubes. In this manner, carrier 24 is permitted limited play as rollers 70 carry the whole apparatus along tubes 20 and 22.

The carrier may have lugs 84 provided in any suitable manner, as, for instance, by being made integral with the casting of the carrier. The lugs, which extend toward the under curve of tubes 20 and 22 may have a slight bevel 86 provided on their ends to accommodate the lugs to the curvature of the tubes. The lugs are spaced from but in position to engage the tubes, and thus will prevent tipping of the carrier under load or similar stress during the operation of the machine.

Spider 26, just as carrier 24, may be a casting of light metal, such as aluminum. In such case, the casting is relieved of sufficient metal from its center portion to increase lightness, but without sacrificing structural strength. Centrally of the spider (Figs. 2, 4 and 5), a boss or hub 88 may be formed to extend downwardly from the bottom face 90 of the spider. An opening 92 may be formed in hub 88, to be in line with an opening 94 which may be formed in a hub 96 which extends upwardly from carrier 24. Hubs 88 and 96 extend toward and approach each other, but do not meet. Extending through openings 92 and 94 is a spindle 98 which may be threaded at end 100 which extends through opening 94. A nut 102, engaged on end 100, will lock the spindle in position. The upper kerfed head 104 of spindle 98 engages against a thrust bearing 106 which, in turn, bears against the bottom of the recess 108 in which opening 92 is positioned. A bushing 110 seats in opening 92 to receive spindle 98.

Figure 2:
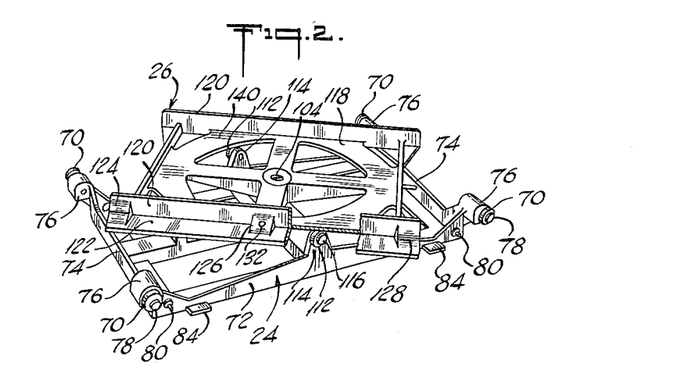
Fig. 2 is an elevational perspective view of the carrier and the spider forming the turntable, showing these parts separated from the machine, and showing those parts in the positions they have assumed in Fig. 1.

Spider 26, which thus is permitted rotation, is supported for such rotation on a set of rollers 112 which are positioned on lugs 114 on the spider. Both rollers 112 and rollers 70 are provided suitable anti-friction means, such as ball or roller bearings upon the spindles 78 and 116 mounting such rollers. Lugs 114 are formed on the carrier so that the supporting faces 112 (Fig. 5) are higher than the topmost portions of rollers 70. A complete circular portion 118 of metal is provided as a part of the spider so that its bottom face may ride on rollers 112 (Fig. 2). Spindles 116 (Fig. 5) may be locked in lugs 114 by suitable locknuts. At each of two parallel sides 120 of the spider an angle 122 may be formed as a part of the casting, the angle extending substantially the entire length of the side of the spider. There may be sufficient metal at intervals, as, for instance, at positions 124, 126 and 128, to provide lands upon which tubes 130 may rest. These tubes are positioned upon the angles so that the rounded faces of the tube rest upon lands 124, 126 and 128. Threaded recesses 132 may be provided at lands 126. Through an opening 134 which may be provided in each tube 130, a screw or bolt 136 may be extended to engage in recess 132, and thus secure the tube to the spider. A platform 138 may be disposed and secured in place upon the web 140 of the spider.

At the opposed ends of tubes 130 (Figs. 1, 3, and 5) are positioned end plates 141. Each end plate is provided with a pair of openings 142 through which tubes 130 extend. A slot 143 is formed in each end plate to open into opening 142, and thus, by means of a suitable cap screw 133 engaged in an associated threaded recess, an effective clamp is provided to lock the end plates firmly to tubes 130.

Each end plate may be provided with a suitable trough or recess 145 within which a channel 146 may be seated. The channel and the recess with which it is to be associated may follow substantially the same detail as described in connection with channels 48. Suitable bolts 147 may be associated with openings 148 in end plates 141 and openings 149 in channels 146 to permit adjustment of channels 146 lengthwise of recesses 145. In this manner, the top end 150 of the channel may be located selectively at different levels. At end 150, a recess 151 may be formed for the reception of the end of a rod 152 upon which roll 14 suitable wings 153 may be assembled in association with the recessed end 150 so as to receive rod 152 and to guide it into recess 151.

Figures 8, 12:
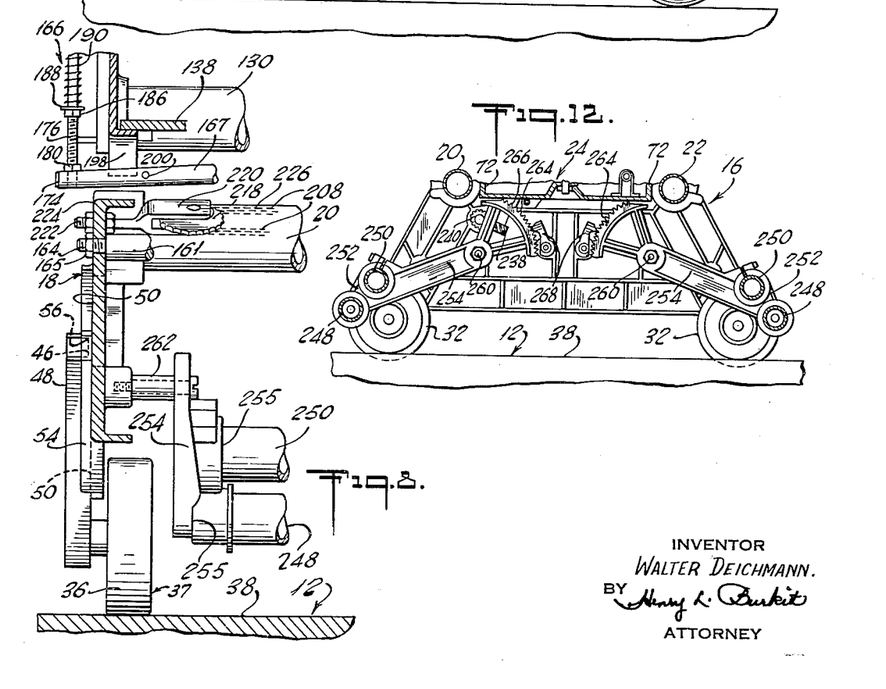
Fig. 8 is a view in part complementary to Fig. 7, and is a vertical cross-sectional view, substantially on the line 8—8 of Fig. 4, to illustrate that portion of the machine not illustrated at the left hand end of Fig. 7.
Fig. 12 is a detail elevational view of a modified form of the machine in which fabric-guiding means are located at each end of the machine.

Astride tubes 20 and 22 is positioned a cam member 154 (Fig. 1). At each end of the member, a recess 155 (Fig. 4a) to be received over the tube at that end. A separate piece 157 is provided with a recessed portion 157.1 to be received on the under portion of the tube. A screw 157.2 is extended through an opening 157.3 into a threaded recess 155.3 in member 154, to clamp member 154 securely in place on tube 20. Member 154 (Fig. 4) may have portions of cushioning material 158 secured to side face 159, by cementing of the portions or by any other suitable means. Material 158 provides bumpers against which the lugs 76 of carrier 24 will be stopped, to limit travel of the carrier along tubes 20 and 22 in one direction. Secured to and extending from frame 18 may be a rod 161 on the end of which is a cushioning member 162 providing a stop to limit travel of the carrier in the other direction. Rod 161 may be anchored to frame 18 in any suitable manner, as, for instance, by a screw-threaded end 164 extending through an opening in the frame upon which a locknut 165 (Fig. 8) then may be tightened.

Figures 7, 10:
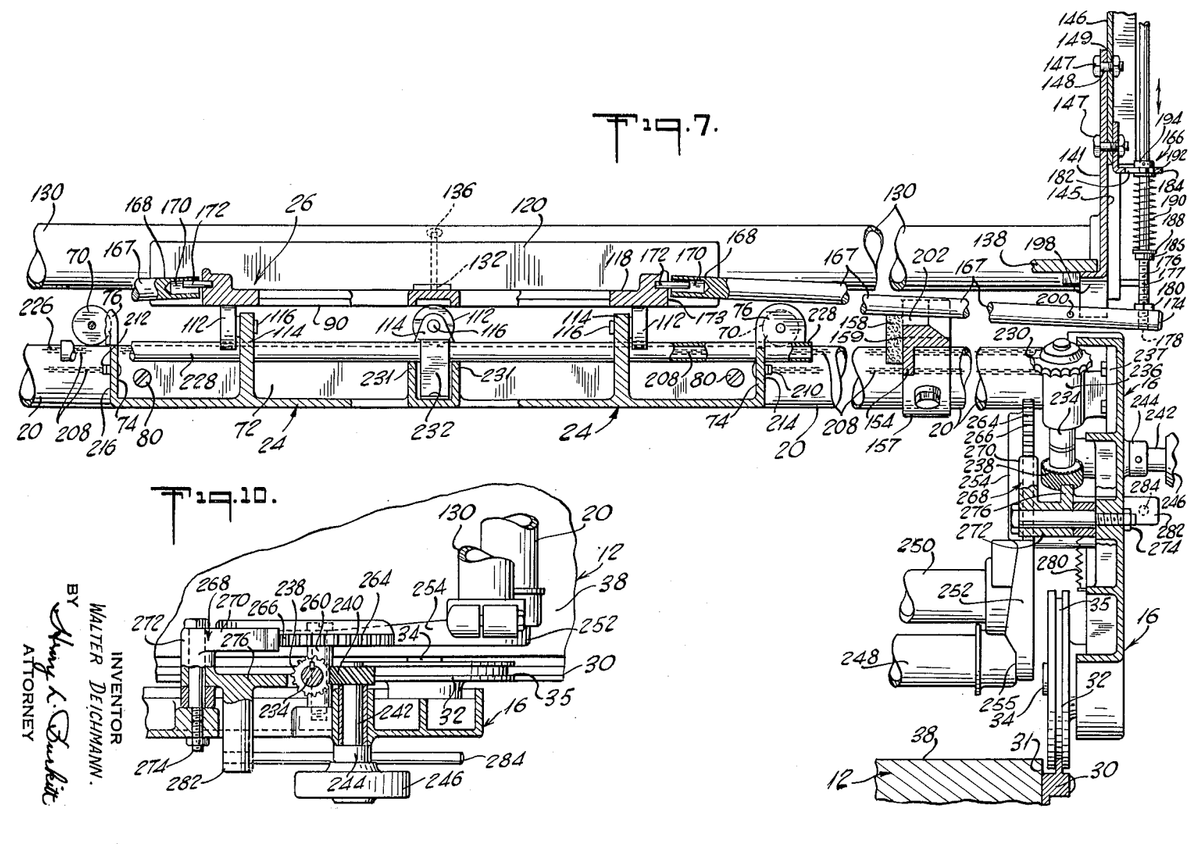
Fig. 7 is a vertical cross-sectional view, substantially on the line 7—7 of Figs. 3, 4 and 9.
Fig. 10 is a detail cross-sectional view, substantially on the line 10—10 of Fig. 5.

To determine a position when carrier 24 and spider 26 are in the "zero" position with relation to each other, each plate 141 carries a latching means 166, which may comprise a rod 167 (Fig. 7) in one end 168 of which a recess 170 may be provided. A pin 172 fixed in an end wall 173 of spider 26 is received within recess 170, providing a loose pivot for rod 167. Rod 167 is long enough to extend from pin 172 to a position outside the side face of the particular plate 141. At end 174 of rod 167, an upright 176 is secured. The upright may have a threaded section 177 the end of which is received in a threaded recess 178 in end 174; a locknut 180 then locks upright 176 rigidly with relation to rod 167.

Upright 176 extends through a slot 182 in an angular bracket 184, the bracket being secured to plate 141 by the same securing means as channel 146. At a position along upright 176 upwardly from rod 167 is located a locknut 186 together with a washer 188 which provides an end support for a spring 190 the other end of which bears against arm 192 of bracket 184. A collar 194, pinned to upright 176 on the other side of arm 192, serves to limit downward movement of upright 176 under the action of the spring. The upright extends further beyond collar 194, terminating in a handle section 196 for manipulation of the latching means. Provided with plate 141, either by being formed as a part thereof or in any other suitable manner, is a downwardly directed U-shaped member 198 between the arms of which rod 167 is permitted vertical movement, but is restrained from lateral movement. A pin 200 extends through rod 167 immediately beyond member 198 so as to limit against movement of the rod which might separate recess 170 and pin 172. When channel 146 is to be adjusted, bracket 184 also is loosened, and then is locked back into the same place.

Figure 3:
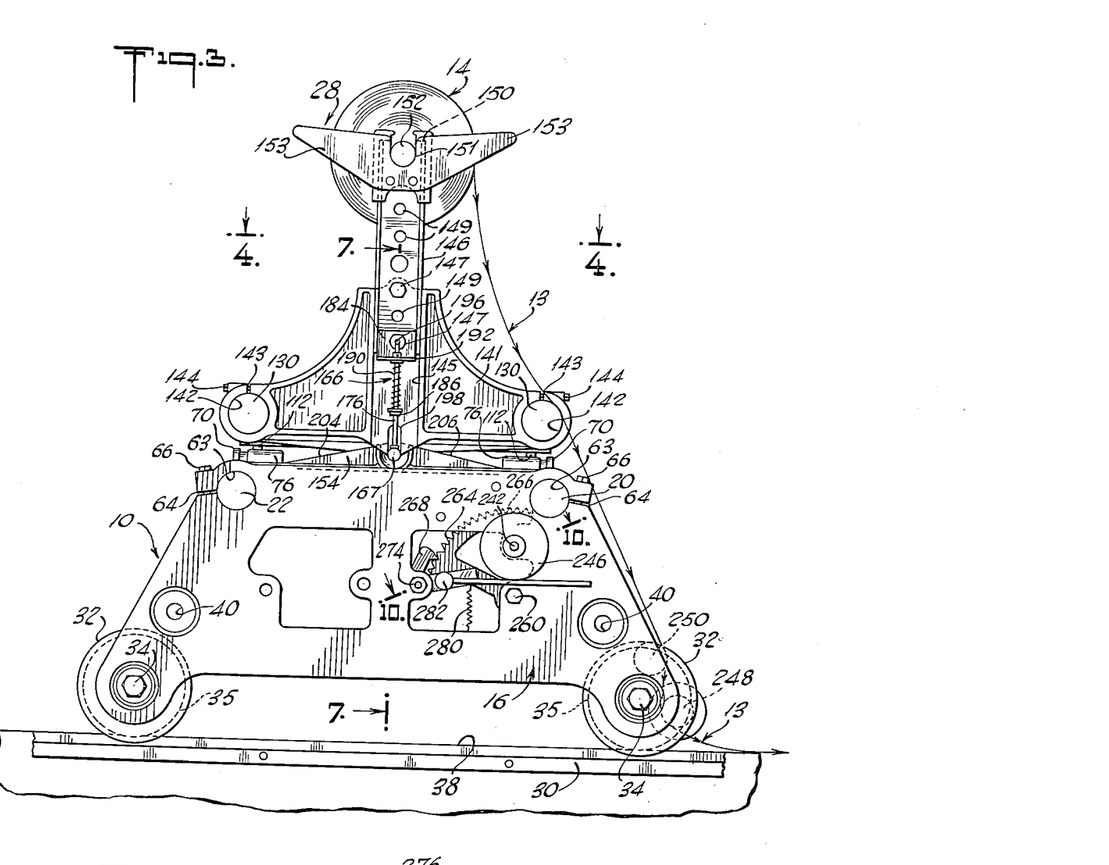
Fig. 3 is a side elevational view, to enlarged scale, illustrating the machine of Fig. 1, shown mounted upon a table.
Figures 4, 4A:
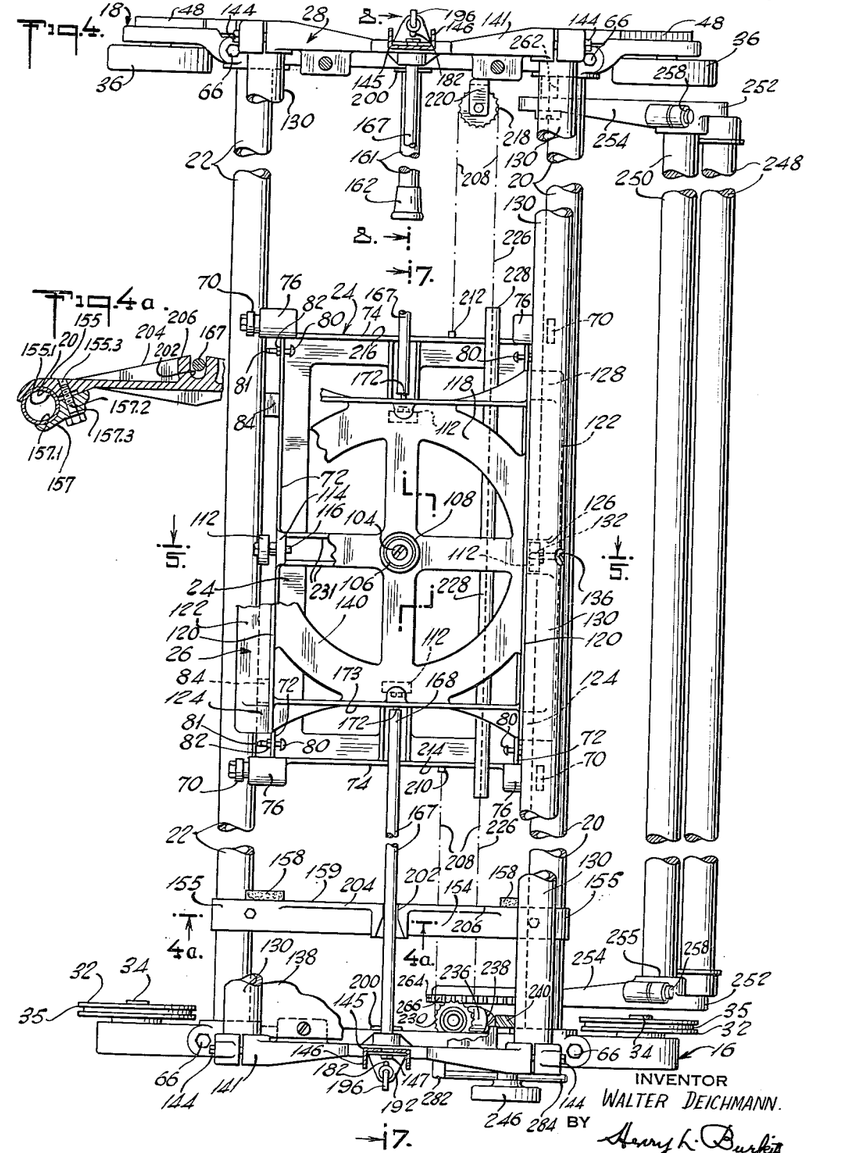

Rod 167 is intended to be received within a slot 202 opening upwardly from cam member 154. The upper face of member 154 includes a pair of angularly disposed faces 204 and 206 which are inclined upwardly toward each other, but which terminate at the upper boundaries of slot 202 (Figs. 1, 3 and 4). A rod 167 (Fig. 1), according to the direction in which the spider is being rotated, rides up on one or the other of faces 204 and 206. When the rod reaches slot 202, spring 190 will force the rod into slot 202, whereupon the spider will be held fixed against movement with relation to the carrier. No matter what the lateral displacement of carrier 24 along tubes 20 and 22 is, one of rods 167 will be capable of moving into slot 202. When the carrier is at the very left hand limit of movement, and in abutment with cushioning material 158, it may be possible to make the adjustment such that such engagement does not take place. In such position, the carrier will have been moved to such position for the express purpose of swiveling the spider, either for reversing the direction of the material, or for mounting a new roll of material upon the cloth-supporting elements. At such time, it may be desirable in many cases that the latching mechanism be ineffective so that it is unnecessary to manipulate handle section 196. If desired, the disposition of rod 167 and cam member 154 may be such that the latching mechanism becomes effective at every position of the carrier lengthwise of tubes 20 and 22, so as to require manipulation of section 196 in order to release the spider to move with relation to the carrier.

In order to facilitate the adjustment of carrier 24 and spider 26 lengthwise along the guides provided by tubes 20 and 22, a chain 208 may have its ends 210 and 212 anchored at opposite walls 214 and 216 of carrier 24. Chain 208 (Fig. 8) is trained around a sprocket 218 which is carried in a forked member 220. Member 220 is mounted upon a threaded pin 222 which may be extended through an opening in a wall 224 of frame 18, and there is anchored by suitable locknuts. Member 220 is disposed so that sprocket 218 is positioned at an angle, so that chain 208 proceeds from the lower level of the secured ends 210 and 212 to a higher level by passing around sprocket 218. Chain 208 extends back to frame 16, the upper portion 226 of the chain being guided through a tube 228 to a sprocket 230. Tube 228 rests upon ribs 74 and other ribs 231 provided for that purpose and forming a part of the carrier, and is held against the top faces of the ribs by means of straps 232 which are, in turn, secured to bottom 233 of the carrier.

In frame 16, a short shaft 234 is mounted in a bearing 236 which is disposed at an angle to the vertical. Sprocket 230, carried by shaft 236, is positioned to parallel sprocket 218, and thus to accommodate the chain at two different levels wherein the two different levels of the chain are determined not by the diameter of the sprocket but merely by the angular displacement of the sprockets. Bracket 237 carrying bearing 236 may be secured to frame 16 in any suitable manner, as, for instance, by means of bolts. At the lower end of shaft 234 is fixed a spiral gear 238 which, in turn, is meshed with another spiral gear 240 carried upon a short shaft 242 provided bearings in frame 16 and is at right angles to shaft 234. A suitable collar 244 is used to locate the shaft and gear 240 with relation to gear 238. A handwheel 246 may be fixed to the end of shaft 242, and thus provide for manipulation of shaft 242. This arrangement provides for great facility in causing back and forth motion of carrier 24, which rides easily upon its rollers on tubes 20 and 22, being easily propelled by chain 208. The worker may place his hand on handwheel 246 and impart force to push the machine along the table, and, at the same time, adjust the registry of material 13 coming off roll 14 with the edges of the layers already positioned on the table by turning the handwheel. Very slight effort will be required to make such lateral adjustment. By means of pin 222 and its locknut, easy adjustment is provided for forked member 220, in producing the proper tension for chain 208. Also, by reason of the relative disposition of shafts 234 and 242 to each other, and the form of gears 238 and 240, it is possible to propel the carrier merely by pushing or pulling upon it or the roll of cloth without manipulating handwheel 246. The latter provides a very accurate adjustment.

In order to guide the fabric properly down to the table, bar 250 and a roller 248 are positioned adjustably with relation to the surface of the table. The bars and roller are carried in end plates 252. Each plate is carried at the end of an arm 254. Each plate may be provided with sockets 255 to receive the ends of the bar and roller. In the case of roller 248, the socket provides means for receiving a ball bearing to permit free rotation of the roller. The walls of the sockets may be split to permit compressing action to be obtained from the use of screws 258 to tighten the walls of the sockets against bar 250 and the bearing for roller 248, to retain them in position. Arms 254 are provided bearings 260 and 262 upon the respective frames 16 and 18.

On the side adjacent the operator, arm 254 may be extended into an arcuate ratchet 264 which moves together with that arm 254 at all times. Positioned to engage teeth 266 of that ratchet is a pawl 268 carried upon the end of an arm 270 which has a hub 272 carried in a bearing member 274 on frame 16. Extending from hub 272 is an arm 276 at one end of which is an opening 278 to receive an end of a tension spring 280 the other end of which is anchored to frame 16. Intermediately of arm 276 is a post 282 which extends through a relief in frame 16 to a position outside of the frame where a handle 284 may be secured. By manipulating handle 284, release of pawl 268 from teeth 266 may be effected against the action of spring 280.

Figure 11:
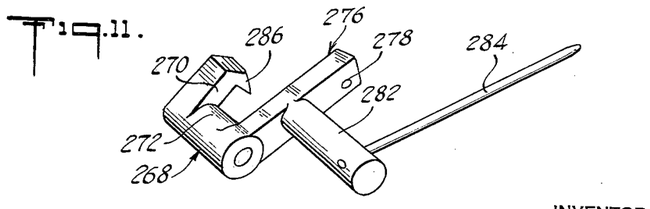
Fig. 11 is a detail perspective view, to enlarged scale, of the pawl which forms a part of the fabric-guiding means of the machine.

Teeth 266 and tooth 286 of pawl 268 have faces which are formed to be substantially at an angle of 60° to each other. However, the angle of face 288 of tooth 266, that is, the face facing downwardly at the time of engagement with tooth 286, is at an angle of less than 30° to the radius from the particular bearing 260 or 262. When fabric is threaded from roll 14 over bar 250, then between bar 250 and roller 248, and then under roller 248, and is being spread upon the table, the movement of the fabric will produce an upward force which will tend to cause ratchet 264 to move. Foreshortening the angle between face 288 and the radius assures that the pawl will not slip. In the event that the operator should put his hand upon bar 250 or roller 248, the indicated angle has been found, in normal operation, to be sufficient to prevent the bar and roller from releasing and moving down to crack the operator's hand against the table. On the other hand, if a roll of cloth accidentally should fall upon bar 250 or roller 248, the angle of attack between the face of tooth 286 and face 288 is sufficient to assure that release will occur so that roller 248 with bar 250 will fall to the table and not cause damage to the holding elements associated with those bars.

While apparatus of this type may be operated entirely without bar 250 and roller 248, in many cases the operator desires to have such means for guiding the fabric properly to the surface. Thus, the attack of pawl 268 against ratchet 264 permits adjustment of the level of these bars with relation to the surface. This is particularly true in connection with a possible adjustment of the wheels for the level of the carriage and the total quantity of goods to be piled up with relation to the carriage. Thus, as the number of layers being spread increases, the operator may raise the bars merely by pulling up on those bars. A slight upward force is all that is necessary to move the bars against the action of the pawl; likewise, the pawl may be released by actuating handle 284.

In some instances, it is desirable to lay the fabric in both directions. In that case, a double set of bars 250 and rollers 248 (Fig. 12) may be provided, one to operate in each direction of travel of the machine along the table.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. In a spreading machine, a carriage for movement over a table, the carriage comprising a pair of end frames, a plurality of members extending between the frames and retaining the frames rigidly in spaced apart association, a platform having a plurality of rollers, the platform being positioned between a pair of the members with certain of the rollers riding upon said pair of members, a dolly, means for pivoting the dolly on the platform, cloth-carrying means mounted on the dolly, certain of the rollers supporting the dolly as it is rotated on said pivoting means, latch means carried by the dolly, and means carried by the carriage astride and pair of members for receiving the latch means at every position of the platform along the pair of members.

2. In a spreading machine, a carriage, wheels for supporting the carriage with relation to and for movement over a table, the carriage comprising a pair of end frames, means on the frames to provide a plurality of levels for the wheels to determine a plurality of levels of operation for the carriage with relation to the table, a plurality of members extending between the frames and retaining the frames rigidly in spaced apart association, a platform having a plurality of rollers, the platform being positioned between a pair of the members with certain of the rollers riding upon said pair of members, a dolly, means for pivoting the dolly on the platform, cloth-carrying means mounted on the dolly, certain of the rollers supporting the dolly as it is rotated on said pivoting means, latch means carried by the dolly, and means carried by the carriage astride the pair of members for receiving the latch means at every position of the platform along the pair of members.

3. In a spreading machine, a carriage, wheels for supporting the carriage with relation to and for movement over a table, the carriage comprising a pair of end frames, a plurality of members extending between the frames and retaining the frames rigidly in spaced apart association, a platform positioned between a pair of the members, the platform carrying a plurality of rollers positioned upwardly from the general level of the platform, certain of the rollers riding upon said pair of members so that the platform is suspended between and below the top level of the members, a dolly, means for pivoting the dolly on the platform, cloth-carrying means mounted on the dolly, certain of the rollers supporting the dolly as it is rotated on said pivoting means, latch means carried by the dolly, and means carried by the carriage astride the pair of members for receiving the latch means at every position of the platform along the pair of members.

4. In a spreading machine, a carriage, wheels for supporting the carriage with relation to and for movement over a table, the carriage comprising a pair of end frames, a plurality of members extending between the frames and retaining the frames rigidly in spaced apart association, a platform positioned between a pair of the members, the platform carrying a plurality of rollers positioned upwardly from the general level of the platform, certain of the rollers riding upon said pair of members so that the platform is suspended between and below the top level of the members, a dolly, means for pivoting the dolly on the platform, and cloth-carrying means mounted on the dolly, and certain of the rollers supporting the dolly as it is rotated on said pivoting means.

5. In a spreading machine, a carriage, wheels for supporting the carriage with relation to and for movement over a table, the carriage comprising a pair of end frames, a plurality of tubular members extending between the frames and retaining the frames rigidly in spaced apart association, a carrier having a plurality of upwardly extending portions, rollers on the portions, certain of the rollers riding on a pair of the members, the carrier being positioned between said certain rollers to extend below the top level of said members, a dolly pivotally mounted on the carrier and supported on other rollers, cloth-carrying means mounted on the dolly, latch means carried by the dolly, and means carried by the carriage astride the pair of members for receiving the latch means at every position of the carrier along the pair of members.

6. In a spreading machine, a carriage, wheels for supporting the carriage with relation to and for movement over a table, the carriage comprising a pair of end frames, a plurality of tubular members extending between the frames and retaining the frames rigidly in spaced apart association, a carrier having a plurality of upwardly extending portions, rollers on the portions, certain of the rollers riding on a pair of the members, the carrier being positioned between said certain rollers to extend below the top level of said members, a dolly pivotally mounted on the carrier and supported on other rollers, and cloth-carrying means mounted on the dolly.

7. In a spreading machine, a carriage, wheels for supporting the carriage with relation to and for movement over a table, the carriage comprising a pair of end frames, a plurality of members each having a substantially rounded cross-section, the members extending between the frames and retaining the frames rigidly in spaced apart association, a carrier having a plurality of upwardly extending portions, rollers on the portions, certain of the rollers riding on the substantially rounded cross-section of a pair of the members, the carrier being positioned between said pair of the members, a spider, means for pivoting the spider on the carrier, cloth-carrying means mounted on the spider, certain others of the rollers supporting the spider as it is rotated on said pivoting means, latch means carried by the spider, and means astride the pair of members for receiving the latch means at every position of the carrier along the pair of members.

8. In a spreading machine, a carriage, wheels for supporting the carriage with relation to and for movement over a table, the carriage comprising a pair of end frames, a plurality of members each having a substantially rounded cross-section, the members extending between the frames and retaining the frames rigidly in spaced apart association, a carrier having a plurality of upwardly extending portions, rollers on the portions, certain of the rollers riding on the substantially rounded cross-section of a pair of the members, the carrier being positioned between said pair of the members, a spider, means for pivoting the spider on the carrier, and cloth-carrying means mounted on the spider, and certain others of the rollers supporting the spider as it is rotated on said pivoting means.

9. In a spreading machine, a carriage, wheels for supporting the carriage with relation to and for movement over a table, the carriage comprising structure having guides extending transversely of the table, a carrier mounted on the guides for movement transversely of the table, a spider pivotally mounted on the carrier, cloth-carrying means mounted on the spider, latch means carried at each end of the spider, and a single engaging means fixed to and astride the guides for receiving either of the latch means according to the pivoted position of the spider, the single engaging means providing means to cam the particular latching means into latching engagement with the engaging means at every position of the carrier along the guides.

10. In a spreading machine, a carriage, wheels for supporting the carriage with relation to and for movement over a table, the carriage comprising structure having guides extending transversely of the table, a carrier mounted on the guides for movement transversely of the table, a spider pivotally mounted on the carrier, cloth-carrying means mounted on the spider, latch means carried by the spider, the latch means comprising a rod extending lengthwise of and pivotally mounted with relation to the cloth-carrying means, means fixed to and astride the guides for receiving the latch means at every position of the spider, and means associated with the receiving means to cam the rod into latching engagement with the receiving means at every position of the carrier along the guides.

11. In a spreading machine, a carriage, wheels for supporting the carriage with relation to and for movement over a table, the carriage comprising structure having guides extending transversely of the table, a carrier mounted on the guides for movement transversely of the table, a spider pivotally mounted on the carrier, cloth-carrying means mounted on the spider, latch means carried at each end of the spider, each latch means comprising a rod extending lengthwise of and pivotally mounted with relation to the cloth-carrying means, a single engaging means fixed to and astride the guides for receiving either of the latch means according to the pivoted position of the spider, and means associated with the single engaging means to cam the rod of the particular latching means into latching engagement with the engaging means at every position of the carrier along the guides.

12. In a spreading machine, a carriage, wheels for supporting the carriage with relation to and for movement over a table, the carriage comprising structure having guides extending transversely of the table, a carrier mounted on the guides for movement transversely of the table, a spider pivotally mounted on the carrier, cloth-carrying means mounted on the spider, latch means carried by the spider, the latch means comprising a rod extending lengthwise of and pivotally mounted with relation to the cloth-carrying means, the rod having an upright substantially fixedly associated therewith at a position adjacent the end removed from the said pivotal mounting, means carried by and astride the guides for receiving the latch means at every position of the spider, means between the cloth-carrying means and the upright for urging the rod normally downwardly to a position for engaging the receiving means, and means associated with the receiving means to cam the rod into latching engagement with the receiving means at every position of the carrier along the guides.

13. In a spreading machine, a carriage, wheels for supporting the carriage with relation to and for movement over a table, the carriage comprising structure having guides extending transversely of the table, the guides being at least in part of rounded cross-section, a plurality of rollers rolling upon the guides substantially along the highest point of said rounded cross-section, a carrier between and supported by the rollers and between the guides so that a substantial portion of the carrier is below the highest point of said cross-section, a spider pivotally mounted on the carrier, so that the lowermost portion of the spider may be moved to clear the highest point of said cross-section and cloth-carrying means mounted on the spider.

14. In a spreading machine, a carriage, wheels for supporting the carriage with relation to and for movement over a table, the carriage comprising structure having a pair of guides extending transversely of the table, the guides being circular in cross-section, a plurality of rollers rolling upon the guides substantially along the highest point of said circular cross-section, a carrier between and supported by the rollers and between the guides so that a substantial portion of the carrier is below the highest point of said cross-section, a spider pivotally mounted on the carrier, so that the lowermost portion of the spider may be moved to clear the highest point of said cross-section and cloth-carrying means mounted on the spider.

15. In a spreading machine, a carriage wheels for supporting the carriage with relation to and for movement over a table, the carriage comprising structure having a pair of guides extending transversely of the table, the guides being circular in cross-section, a plurality of rollers rolling upon the guides substantially along the highest point of said circular cross-section, a carrier between and supported by the rollers and between the guides so that a substantial portion of the carrier is below the highest point of said cross-section, means for limiting lateral movement of the carrier between the guides, a spider pivotally mounted on the carrier, so that the lowermost portion of the spider may be moved to clear the highest point of said cross-section and cloth-carrying means mounted on the spider.

16. In a spreading machine, a carriage, wheels for supporting the carriage with relation to and for movement over a table, the carriage comprising structure having a pair of guides extending transversely of the table, the guides being circular in cross-section, a plurality of rollers rolling upon the guides substantially along the highest point of said circular cross-section, a carrier between and supported by the rollers and between the guides so that a substantial portion of the carrier is below the highest point of said cross-section, means for restraining the carrier against tipping by reason of off-balance load, a spider pivotally mounted on the carrier, so that the lowermost portion of the spider may be moved to clear the highest point of said cross-section and cloth-carrying means mounted on the spider.

17. In a spreading machine, a carriage, wheels for supporting the carriage with relation to and for movement over a table, the carriage comprising structure having a pair of guides extending transversely of the table, the guides being circular in cross-section, a plurality of rollers rolling upon the guides substantially along the highest point of said circular cross-section, a carrier between and supported by the rollers and between the guides so that a substantial portion of the carrier is below the highest point of said cross-section, means for limiting lateral movement of the carrier between the guides, means for restraining the carrier against tipping by reason of off-balance load, a spider pivotally mounted on the carrier, so that the lowermost portion of the spider may be moved to clear the highest point of said cross-section and cloth-carrying means mounted on the spider.

18. In a spreading machine, a carriage, wheels for supporting the carriage with relation to and for movement over a table, the carriage comprising structure having a pair of guides extending transversely of the table, the guides being circular in cross-section, a plurality of rollers rolling upon the guides substantially along the highest point of said circular cross-section, a carrier between and suspended from the rollers and between the guides so that a substantial portion of the carrier is below the highest point of said circular cross-section, means for adjustably determining limits for lateral movement of the carrier, a spider pivotally mounted on the carrier, so that the lowermost portion of the spider may be moved to clear the highest point of said circular cross-section and cloth-carrying means mounted on the spider.

19. In a spreading machine, a carriage, wheels for supporting the carriage with relation to and for movement over a table, the carriage comprising structure having guides extending transversely of the table, a carrier mounted on the guides for movement transversely of the table, a spider pivotally mounted on the carrier, cloth-carrying means mounted on the spider, latch means carried by the spider, the latch means comprising a rod, the rod being pivotally mounted on the spider and extending lengthwise of the cloth-carrying means, the rod being mounted to extend downwardly normally at an angle to the horizontal, means carried by and astride the guides for receiving the latch means at every position of the spider, and means associated with the receiving means to cam the rod into latching engagement with the receiving means at every position of the carrier along the guides, the receiving means being positioned so that the rod will substantially clear the receiving means when the carrier has been moved on the guides to one of its lateral limits of movement.

20. In a spreading machine, a carriage, wheels for supporting the carriage with relation to and for movement over a table, the carriage comprising structure including a pair of end frames, guides extending transversely of the table between the frames, a carrier carried by the guides for movement transversely of the table, a spider pivotally mounted on the carrier, cloth-carrying means mounted on the spider, means for adjusting the position of the carrier along the guides, the adjusting means including a manually actuable member carried on the outside face of one of the end frames, drive means controlled by the manually actuable member, and a band having its ends secured to the carrier and extending from the carrier to the end frame at the other side of the carriage and to the drive means, the band having its two portions at different horizontal levels, said drive means being between the manually actuable member and the band and causing the band to move the carrier along the guides.

21. In a spreading machine, a carriage, wheels for supporting the carriage with relation to and for movement over a table, the carriage comprising structure including a pair of end frames, guides extending transversely of the table between the frames, a carrier carried by the guides for movement transversely of the table, a spider pivotally mounted on the carrier, cloth-carrying means mounted on the spider, means for adjusting the position of the carrier along the guides, the adjusting means including a manually actuable member carried on the outside face of one of the end frames, drive means controlled by the manually actuable member, a band having its ends secured to the carrier, and a tube positioned on the carrier, the band extending from the carrier to the end frame at the other side of the carriage and then back through the tube to the drive means, the band having its two portions at different horizontal levels, said drive means being between the manually actuable member and the band and causing the band to move the carrier along the guides.

22. In a spreading machine, a carriage, wheels for supporting the carriage with relation to and for movement over a table, the carriage comprising structure including a pair of end frames, guides extending transversely of the table between the frames, a carrier carried by the guides for movement transversely of the table, a spider pivotally mounted on the carrier, cloth-carrying means mounted on the spider, means for adjusting the position of the carrier along the guides, the adjusting means including a manually actuable member carried on the outside face of one of the end frames, drive means controlled by the manually actuable member, and a sprocket chain having its ends secured to the carrier and extending from the carrier to the end frame at the other side of the carriage and to the drive means, the drive means including a sprocket disposed at an angle to the horizontal, to dispose the two portions of the chain at different horizontal levels, said drive means being between the manually actuable member and the chain and causing the chain to move the carrier along the guides.

23. In a spreading machine, a carriage, wheels for supporting the carriage with relation to and for movement over a table, the carriage comprising structure including a pair of end frames, guides extending transversely of the table between the frames, a carrier carried by the guides for movement transversely of the table, a spider pivotally mounted on the carrier, cloth-carrying means mounted on the spider, means for adjusting the position of the carrier along the guides, the adjusting means including a manually actuable member carried on the outside face of one of the end frames, drive means controlled by the manually actuable member, a sprocket chain having its ends secured to the carrier, and a tube positioned on the carrier, the chain extending from the carrier to the end frame at the other side of the carriage and then back through the tube to the drive means, the drive means including a sprocket disposed at an angle to the horizontal to dispose the two portions of the chain at different horizontal levels, said drive means being between the manually actuable member and the chain for causing the chain to move the carrier along the guides.

References Cited in the file of this patent
UNITED STATES PATENTS

| | | |
|---|---|---|
| 1,078,302 | Moritz | Nov. 11, 1913 |
| 1,343,339 | Rosenblum | June 15, 1920 |